Figure 1:
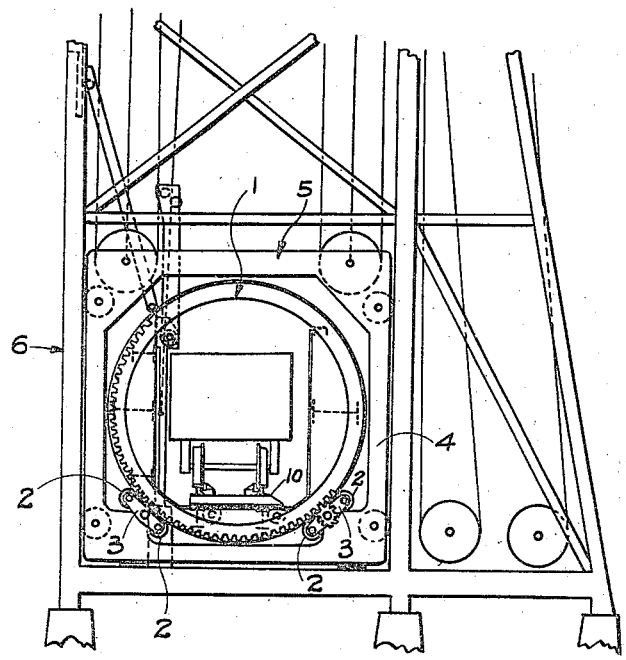

Jan. 19, 1943.　　　P. A. FANNER.　　　2,308,597
CAR RETARDING OR BRAKING MECHANISM
Original Filed June 19, 1939　　2 Sheets-Sheet 1

INVENTOR.
PERCIVAL A. FANNER
BY *Hull, West & Chilton*
ATTORNEYS.

Jan. 19, 1943.   P. A. FANNER   2,308,597
CAR RETARDING OR BRAKING MECHANISM
Original Filed June 19, 1939   2 Sheets-Sheet 2
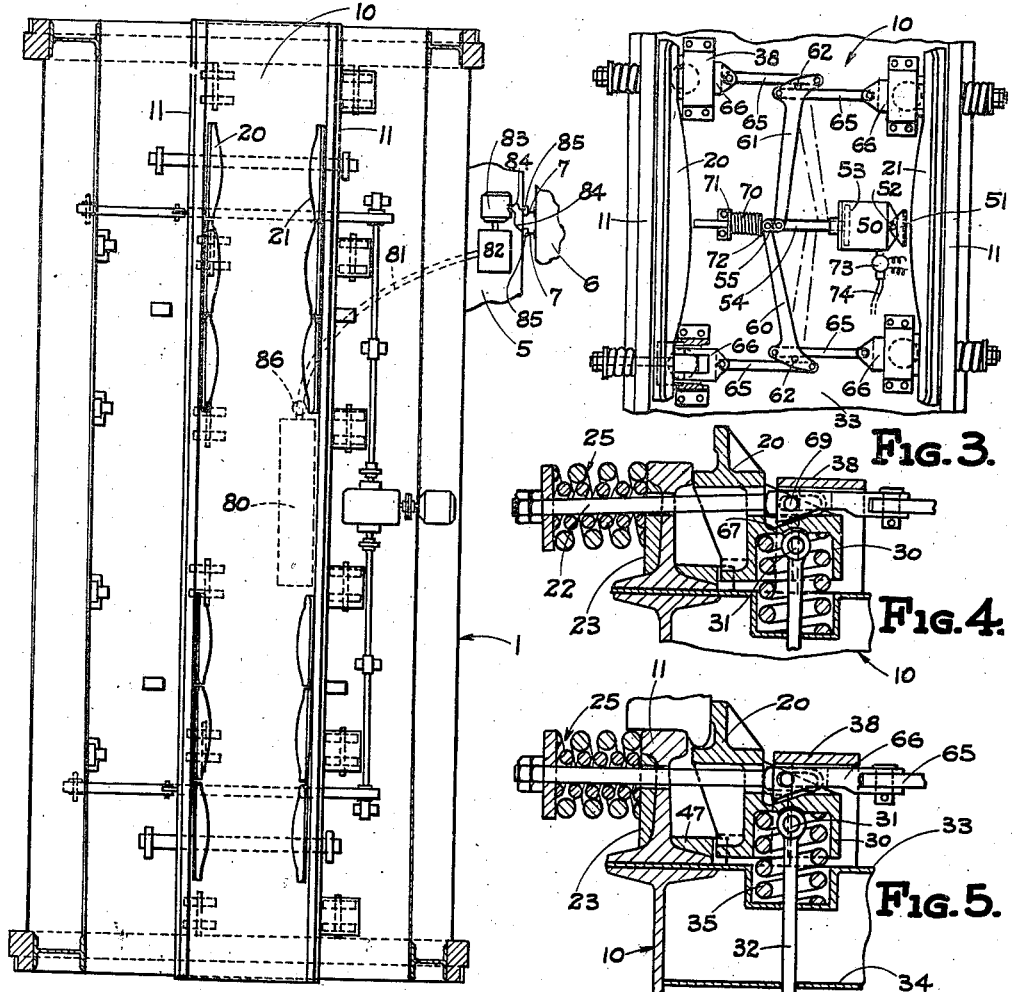
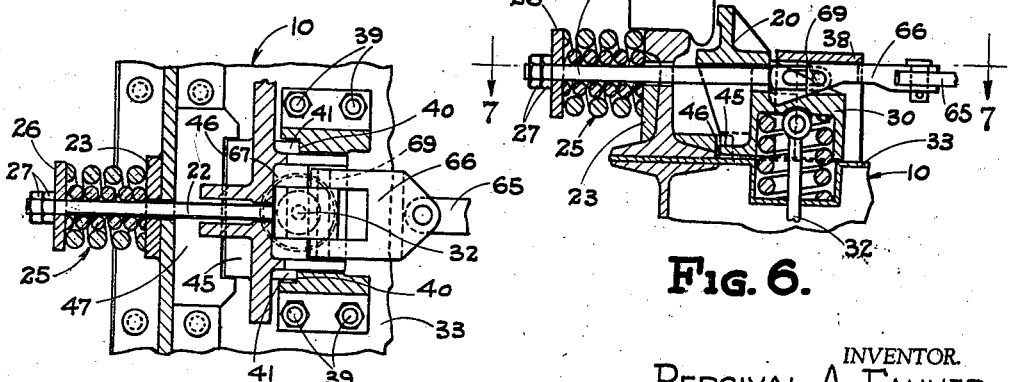
INVENTOR.
PERCIVAL A. FANNER
BY Hull, West & Chilton
ATTORNEYS.

Patented Jan. 19, 1943

2,308,597

UNITED STATES PATENT OFFICE 2,308,597

CAR RETARDING OR BRAKING MECHANISM

Percival A. Fanner, Lakewood, Ohio

Original application June 19, 1939, Serial No. 279,880. Divided and this application August 19, 1940, Serial No. 353,158

13 Claims. (Cl. 188—62)

This is a division of my copending application Serial No. 279,880, filed June 19, 1939, entitled "Car dumping machine," and whereon Letters Patent No. 2,242,819 were issued May 20, 1941.

The present invention relates in general to car retarding or braking mechanisms of the track brake class, and has more particular reference to improvements in mechanisms of this character for use on lifting or movable structures, such as car dumpers or elevators, where slow car travel speeds are prevalent and the operation requires so-called "spotting," or bringing the car to rest, between two desired points on the track.

One object of my invention is to provide an effective car retarding or braking mechanism of minimum weight. In the accomplishment of this I use a part of the car weight to create braking force on the car wheels in cooperation with resilient means for producing shoe pressure in a horizontal direction.

Another object of my invention is to provide a retarder that is more efficient in utilizing shoe pressure than heretofore. To the attainment of this end I construct and operate my retarder in units, the opposed braking shoes of each unit being only long enough to engage two car wheels each at a time. This, with resilient means for producing horizontal and vertical pressures, permits each shoe to float freely in all directions (excepting in a direction longitudinally of the track), and properly contact simultaneously two wheels of different widths and flange dimensions. This manner of resiliently supporting the brake shoes so that they float, so to speak, also permits the shoes to accommodate themselves to variations in wheel gauge, i. e., the distance between wheels on the same axles. In this connection it may be explained that car wheels on the same axle are usually matched or paired on the tread diameter. However, adjacent truck wheels that are arranged in tandem to bear on the same rail may be of different tread diameters due to wear, and corresponding differences in height of flange will be present.

Another object of my invention is to provide a retarder or track brake that does not set up objectionable stresses in the car axles when applied. By applying lateral braking pressure only on the inside vertical surfaces of the wheels adjacent the track rails, I set up bending stresses in the standard railroad car axles opposite in direction to those stresses produced by the vertical car loads which are imposed upon the bearings of the axles outwardly of the wheels.

Another object of my invention is to provide a retarder which may be used as a brake for holding the car after the latter has been stopped. This brake, as the retarder may be termed in the present instance, and considering its use on a car dumper or elevator, may remain set as the car dumper or elevator structure is in motion, thus obviating the present practice of setting the railroad car hand brakes after "spotting" the car, and thereafter having to release the same by hand before running the car off of the structure. The side pressure of the shoes on the wheels still produces braking effect against car end motion, even if part of the weight is removed from the rails, as is the case when a car is turned over in a dumper. Furthermore, in the mechanism of my invention, no expenditure of power is needed to keep the brakes set. Power is required for a short time only while the car is being released from the retarder.

Another object of my invention is to provide a car retarder which can be conveniently controlled at all times from a point outside the movable structure. For car elevators, where cars are run on at one elevation and run off at another, the control wires and switches of the electromagnetic control shown herein may be paralleled, with a set at each elevation, so that the brakes may be set at one elevation by an operator, and released at another elevation by either the same operator or another one stationed at the elevation where the release occurs. The source of fluid pressure (the medium preferred for operating the mechanism), being always on the movable structure and close to the retarder, assures this setting and releasing of the brakes in the shortest possible time.

With these and other objects in view, my invention may be defined as consisting of the combinations and arrangements of parts set out in the claims appended hereto.

Figure 8:
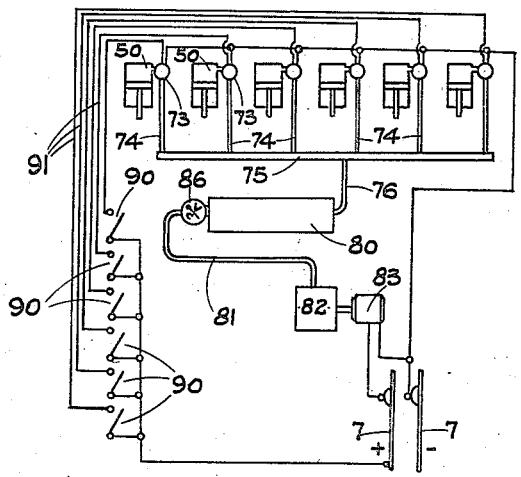

In the accompanying drawings which form a part hereof, Fig. 1 is a partial end elevation of a car dumper incorporating my car retarding and braking mechanism and indicating the position of the same in relation to the rest of the structure; Fig. 2 is a horizontal section through a car dumper cradle showing the position of the car retarder shoes relative to the track rails, the view also including the fluid pressure pump and, in dotted lines, the reservoir for the fluid pressure, parts of the several braking or retarding units being omitted for clearness; Fig. 3 shows, in plan, a retarder unit including two opposed shoes with the fluid pressure means energized and the shoes, as a consequence thereof, held away from the rails in ineffective position; Fig. 4 is a cross section through the retarded shoe and track rail in the vertical plane of one of the sets of springs and associated parts by which the shoe is yieldingly sustained, this view showing the mechanism in normal position; Fig. 5 is a view, similar to Fig. 4, showing a car wheel in engagement with the shoe; Fig. 6 is another view of the same character showing the retarder in released position, as when the fluid pressure means is energized, as in Fig. 3; Fig. 7 is a horizontal section on the line 7—7 of Fig. 6, and Fig. 8 is a diagram showing the electric circuits involved and the parts wherewith they are associated.

According to prevailing practice with reference to car dumpers, a car is pushed onto the car supporting platform and bumps off the empty car that has previously been dumped. The oncoming car, after collision with the empty car, retains considerable momentum and is stopped or "spotted" in the proper place by manually operated chocks or other devices, and is then held in place by application of its own brakes, or by mechanism incorporated in the dumper and which engages the car wheels. As previously set forth, my improved mechanism serves both as a retarder and brake for slowing down and arresting movement of the car and for holding it in place, as during a dumping operation, and said mechanism involves a plurality of units, arranged in groups along the track and independently operable; and when a car is present on the track within the range of the mechanism, corresponding units of adjacent groups, because of the manner of their spacing, engage the wheels of the front and rear trucks of the car.

Any number of units may be employed, and they may be operated singly or in groups. Electrical means are used for effecting operation of the units and this permits simplification of the parts and the control, as will be apparent from the description that follows.

Referring to the drawings, wherein all but Figs. 3 to 7 are more or less diagrammatic, and for the present with particular reference to Figs. 1 and 2, 1 designates generally an element in the nature of a cylindrical frame structure, herein termed a cylinder, of a size to receive the largest standard cars of the type used for transporting coal, ores, etc., and said cylinder is mounted to revolve or turn on rollers 2 that are carried in equalizing or rocking yokes 3 journaled in end frames 4 of a lifting carriage 5, said carriage being guided through the intervention of antifriction means within a tower structure designated generally by the reference numeral 6, all as will more fully appear by reference to my former application hereinbefore referred to and whereof this case is a division. In Fig. 2 a fragment of the carriage 5 is shown, with respect to which the element or cylinder 1 is rotatable, and included in said view is a fragment of the tower structure 6 which incorporates vertical rail-like electrical conductors 7 that form the opposite sides of a main or supply circuit.

Located within the cylinder 1 is a platform 10, and on this platform is a track or track section consisting of rails 11. Associated with these rails are the several units of my improved retarder or brake mechanism which I shall now proceed to describe in detail.

Pairs of opposed shoes 20 and 21 are arranged adjacent the rails 11 in a position to engage and exert pressure upon or against both the periphery of the flanges and the inner sides of car wheels traversing said rails. By having the shoes press against the edge of the flanges, some of the weight of the load is made to create greater pressure on the inner sides of the wheels due to a tilting action of the shoes, as will presently appear, making the shoes more effective in creating greater friction and producing greater retarding effect. Adjacent each end of each shoe is located the combination and arrangement of parts illustrated in detail in Figs. 4 to 7; and included in each is an elongated eye bolt 22 that passes through an aperture in the web of the track rail 11, the latter being reinforced at 23 about said aperture. A compression spring 25, shown as a multiple spring composed of inner and outer coils, surrounds said bolt 22 and is confined between the adjacent track rail and a washer 26 that is backed up by nuts 27 that are threaded onto the end of the bolt. By virtue of this arrangement, the spring 25 normally holds the adjacent end of the corresponding shoe 20 or 21 tightly against the inner side of the track rail.

Incorporated in each shoe 20, 21, and preferably formed integral therewith, are hollow bosses 30, the same being so located as to be in the vertical planes of the beforementioned eye bolts 22. The recess of each hollow boss 30 opens downwardly, and substantially centrally of the end wall thereof is a part 31 to which the upper end of a bolt 32 is pivoted, said bolt depending through aligned apertures in top and bottom plates 33 and 34 of the previously mentioned platform 10. The top plate 33 is preferably depressed about the bolt hole in opposed relation to the aforesaid end wall of the boss 30, and confined between the depressed portion of the plate 33 and said wall of the boss is a heavy compression spring 35. This spring forces the adjacent end of the shoe 20 or 21 vertically until a stop 36 on the lower end of the bolt 32 strikes against the adjacent portion of the bottom plate 34 of the platform 10.

When a car wheel passes over the track rail 11 within the range of the retarder, the adjacent shoe 20 or 21 is forced away from said rail and is, at the same time, depressed, further compressing and increasing the power of both springs 25 and 35, the shoe assuming the position shown in Fig. 5, under these circumstances. The compression of the spring 35 causes it to impose considerable pressure on the edge of the flange and effects a braking action at this point.

A yoke 38 is engaged downwardly over each boss 30 and is secured, as by bolts 39, to the top plate 33 of the platform 10. As best shown in Fig. 7, the sides of the yoke 38 are provided with internal shoulders 40 wherewith are adapted to engage stops 41 on the shoe 20 or 21, the vertical plane of the shoulders 40 being substantially coincident with the axis of the bolt 32.

I have previously pointed out that the compression of the spring 35 puts pressure of considerable force on the edge of the wheel flange, causing a braking effect at this point. The downward flange pressure and the upward pressure of said spring create a couple which is resisted by another couple consisting of a horizontal wheel pressure against the shoe and a corresponding pressure of the stops 41 of the shoe against the shoulders 40 of the yoke 38. All of this, as will readily be seen, tends to build up pressure against the inside of the wheel.

Also as will appear from Figs. 4 to 7, the shoe is provided, within the region of each set of springs 25 and 35, with a lug 45 that engages within a notch 46 of a member 47 that is welded to the inner side of the base flange of the rail 11. The presence of the lugs 45 within the notches 46 of the members 47 serve to restrain the shoes 20 and 21 against longitudinal movement. The car wheel may approach the shoe when the latter is in normal position, as shown in Fig. 4, and by engagement therewith, urge the shoe to the position shown in Fig. 5, as previously explained; or, as the wheel approaches, the shoe may be released by power, as will presently appear, under which circumstances it reposes in the position shown in Fig. 6, and subsequently permitted, by discontinuance of the application of power, to assume effective condition under which it will engage the wheel, as shown in Fig. 5.

The opposed shoes 20 and 21 of each unit are adapted to be retracted by power means which I shall now describe. A pressure fluid cylinder 50 (there being one for each unit) is mounted upon the platform 10 and is preferably yieldingly connected thereto through a bracket 51 that is secured to the top plate 33 of the platform and to which the cylinder is pivoted at 52. Operating within the cylinder is a piston 53, to the outer end of the rod 54 of which is loosely connected, through a link 55, the terminals of the stems of opposed T-levers 60 and 61. These levers are pivotally supported from the platform 10 at 62 and the ends of the heads of said levers are connected by links 65 to elements 66, desirably in the form of wedges, each of which constitutes a part of one of the combinations associated with and including one of the bosses 30 of the shoes 20 and 21. As will appear from Figs. 4 to 6, the element or wedge 66 has an inclined, or cam, face which coacts with a complementary face 67 on the top of the boss 30; and, as will best appear from Fig. 7, the elements or wedges 66 are bifurcated and embrace the relatively broad slotted heads of the eye bolts 22 and are attached thereto, with a lost motion connection, through the medium of a cross pin 69.

When the piston 53 is forced outwardly by the admission of pressure fluid to the cylinder 50, the elements or wedges 66 will be pulled in a direction away from the rails 11, and, by reason of the fact that they are prevented from lifting by the tops of the yokes 38, will, through the engagement of their cam faces with those 67 of the bosses 30, depress the shoes in opposition to the springs 35. As the elements or wedges 66 are pulled further in the same direction away from the rails 11, the cross pins 69 will engage the ends of the slots in the heads of the eye bolts 22 and pull inwardly on said bolts thereby to further compress the springs 25, causing all pressure of said springs 25 to be released from the shoes 20 and 21. The vertical pressure imposed by the elements or wedges 66 upon the bosses of the shoes 20 and 21, besides compressing the springs 35, as previously explained, also causes a friction drag on the shoes which pulls them away from the car wheels and rails. Such a retracted or released position of a shoe is illustrated in Fig. 6. When the pressure fluid is released from the cylinder 50, all springs will recoil and bring the parts back to the position shown in either Figs. 4 or 5, depending upon whether or not a car wheel is present. A compression spring 70 (Fig. 3), acting between an abutment 71 that is fixed with respect to the platform 10, and an abutment 72 on the piston rod 54, acts, when the pressure fluid is released from the cylinder 50, to positively retract the piston and release the parts to the action of springs 25 and 35.

As shown in the diagram of Fig. 8, a valve 73 is associated with each cylinder 50, and serves to control the admission and exhaust of pressure fluid to and from the cylinder. Pressure fluid is delivered to the several cylinders through conduits 74 from a manifold 75 which communicates, through a pipe 76, with a pressure fluid reservoir 80, the same being shown in dotted lines in Fig. 2. To simplify the drawing and avoid confusion, much of the mechanism of the retarder or brake units, including the cylinders 50, is omitted from the more or less diagrammatic view of Fig. 2; and it may be explained that the cylinder 80 is carried by and is movable with the platform 10 which, in turn, is carried by the element or cylinder 1. Through a flexible conduit 81, the reservoir 80 is placed in communication with a compressor or pump 82 that has driving connection with an electric motor 83. Both the pump and motor are mounted on the carriage 5 wherein the element or cylinder 1 is rotatable, and current is supplied to the motor through electrical cables 84 and shoes 85 that traverse the previously mentioned rail-like conductors 7 that are fixed to the tower structure 6.

Fig. 8 shows not only the wiring diagram of the motor 83, but the control for the valves 73 which, as will be understood, are electrically or magnetically operated. A check valve 86 keeps fluid (air in the present instance) under pressure in the reservoir 80 and in the pipe 76, manifold 75 and conduits 74. The actuation of the valves 73 are under the control of a track "spotter" who is stationed near the entrance end of the platform 10, such actuation being effected through switches 90. These switches may be operated singly or in groups, there being one for each cylinder 50 or, in other words, for each unit. Flexible cables, such as those used on elevators, are represented at 91 and connect the switches 90 with the electrical or magnetic mechanisms of the valves 73.

Having thus described my invention, what I claim is:

1. Mechanism of the class set forth comprising, in combination with a track rail, a brake shoe situated adjacent said rail and having angularly related braking faces for engagement, respectively, with the periphery of the flange, and with the inner side, of a car wheel traversing said rail, resilient means urging the shoe upwardly and laterally toward the rail, and means for depressing the shoe and moving it in a direction away from the rail in opposition to said resilient means.

2. Mechanism of the class set forth comprising, in combination with a track rail, a brake shoe situated adjacent said rail and having angularly related braking faces for engagement, respectively, with the periphery of the flange, and with the inner side, of a car wheel traversing said rail, resilient means supporting the brake shoe and tending to retain it in its most elevated position, further resilient means urging the brake shoe toward the track rail, and means for depressing the shoe and moving it in a direction away from the rail in opposition to both resilient means.

3. Mechanism of the class set forth comprising, in combination with a track rail, a brake shoe situated adjacent said rail and having angularly related braking faces for engagement, respectively, with the periphery of the flange, and with the inner side, of a car wheel traversing said rail, compression springs supporting the brake shoe and tending to retain it in its most elevated position, further compression springs urging the brake shoe toward the track rail, and means for depressing the shoe in opposition to the first mentioned springs and for shifting the shoe in a direction away from the rail in opposition to the second mentioned springs.

4. Mechanism of the class set forth comprising, in combination with a track rail, a brake shoe situated adjacent said rail and having angularly related braking faces for engagement, respectively, with the periphery of the flange, and with the inner side, of a car wheel traversing said rail, resilient means tending to retain the brake shoe in its most elevated position and urging it toward the track rail, an element associated with the brake shoe and shiftable to depress the same and move it in a direction away from the rail, and means for shifting said element.

5. Mechanism of the class set forth comprising, in combination with a track rail, a brake shoe situated adjacent said rail and having angularly related braking faces for engagement, respectively, with the periphery of the flange and with the inner side of a car wheel traversing said rail, spring means supporting the brake shoe and tending to retain it in its most elevated position, further spring means urging the brake shoe toward the track rail, an element associated with the brake shoe and shiftable to depress the same, said element serving also, when shifted, to render said further spring means ineffective and cause the shoe to move in a direction away from the rail, and pressure fluid means for shifting said element.

6. Mechanism of the class set forth comprising, in combination with a track rail, a brake shoe situated adjacent said rail in parallelism therewith and arranged for engagement with a car wheel traversing said rail, resilient means spaced apart longitudinally of and yieldingly supporting the shoe and tending to retain it in braking position with maximum braking force and to maintain it in parallel relation to the rail, and means associated with each of the former means for moving the shoe in opposition to said former means toward or to ineffective position.

7. Mechanism of the class set forth comprising, in combination with a track rail, a brake shoe situated adjacent said rail for braking engagement with car wheels traversing the rail, compression springs spaced apart longitudinally of the shoe for yieldingly supporting the same and tending to maintain it in its most elevated position, spring means similarly spaced with respect to the shoe for urging the shoe toward the track rail, means shiftable to depress the shoe in opposition to the compression springs, operative connections through which said means, when shifted, counteracts the effect of said spring means and permits the shoe to move in a direction away from the rail, and further means for shifting the former means.

8. Mechanism of the class set forth comprising, in combination with a track rail, an elongated brake shoe adjacent the rail, the brake shoe having a lateral extension adjacent each end thereof, compression springs whereon said extensions bear and which springs yieldingly support the shoe and tend to retain it in its most elevated position, the track rail having openings substantially in the vertical planes of said extensions, members extending through said apertures and operatively connected to the brake shoe, said members being provided with abutments in opposed relation to the side of the track rail remote from the shoe, compression springs interposed between the track rail and said abutments for urging the shoe toward the rail, shiftable elements coacting, when shifted, with the aforesaid extensions to depress the brake shoe, lost motion connections between said elements and the aforesaid members whereby, for a part of their movement, said elements serve to retract the members in opposition to the second mentioned springs and permit movement of the brake shoe in a direction away from the rail, and means for shifting said elements.

9. Mechanism of the class set forth comprising, in combination with a track rail, an elongated brake shoe adjacent the rail, the brake shoe having a lateral extension adjacent each end thereof, compression springs whereon said extensions bear and which yieldingly support the shoe and tend to retain it in its most elevated position, the track rail having openings substantially in the vertical planes of said extensions, members having operative connection with the shoe and extending through said apertures, said members being provided with abutments in opposed relation to the side of the track rail remote from the shoe, compression springs interposed between the track rail and said abutments for urging the shoe toward the rail, shiftable elements coacting, when shifted, with the aforesaid extensions to depress the brake shoe, lost motion connections between said elements and aforesaid members whereby, for a part of their movement, said elements serve to retract the members and permit movement of the brake shoe in a direction away from the rail, a pressure fluid actuator, and operative connections between the same and the aforesaid elements whereby the latter may be shifted upon energization of the pressure fluid means.

10. Mechanism of the class set forth comprising, in combination with a track rail, a brake shoe situated adjacent said rail and provided with angularly related braking faces for engagement, respectively, with the periphery of the flange and with the inner face of a wheel traversing said rail, means restraining the shoe against movement longitudinally of the rail while permitting free movement thereof in lateral and vertical directions with respect to the rail, resilient means tending to lift the shoe and to shift it laterally toward the rail, and further means for depressing the shoe and for moving it away from the rail in opposition to the former means.

11. Mechanism of the class set forth comprising, in combination with a track rail having openings at points spaced apart longitudinally thereof, an elongated brake shoe adjacent said rail provided with anglarly related braking faces for engagement, respectively, with the periphery of the flange and with the inner side of a car wheel traversing said rail, said shoe being provided with holes aligned with the openings of said rail and with laterally extending bosses in the vertical planes of said holes, said bosses being recessed on their under side, a platform whereon the track rail is mounted, compression springs whose upper ends are housed within said recesses and which are interposed between the end walls of said recesses and opposed portions of the platform, said springs serving to yieldingly support the shoe, stop means for limiting the upward movement of the shoe, a yoke disposed over each boss and secured to the platform, elements slidable between the tops of said yokes and the opposed top surfaces of the bosses, the elements, when shifted in a given direction, coacting with the bosses in a manner to depress the same, members extending through the aligned holes of the shoe and openings of the rail and having a lost motion connection with the elements, an abutment on each member in opposed relation to the side of the rail remote from the shoe, a compression spring interposed between said abutment and the rail, and means for shifting the aforesaid elements in said given direction.

12. In combination with a car track, car retarding and/or braking mechanism consisting of a plurality of units arranged along said track, each unit comprising a pair of opposed shoes, each of which shoes is just long enough to simultaneously engage two truck wheels in tandem, resilient means sustaining each shoe adjacent the inner side of one of the track rails, said means tending to retain the shoe in its most elevated position in close proximity to the rail in full braking position, pressure fluid means, operative connections between said means and the opposed shoes of the unit, said pressure fluid means serving, when energized to retract said shoes in opposition to the beforementioned resilient means to an ineffective position, a source of pressure fluid supply, communicative connections between said source and the pressure fluid means of the several units, and a control for selectively governing the delivery of pressure fluid to and its emission from the several pressure fluid means.

13. Mechanism of the class set forth comprising, in combination with the rails of a car track, a pair of opposed brake shoes arranged one adjacent the inner side of each rail and supported for movement independently of the other, each shoe having a braking face for engagement with the inner sides of car wheels traversing said rail and being of sufficient length to simultaneously engage two car truck wheels in tandem, resilient means individual to each shoe for urging said shoe toward its respective rail with maximum braking force and tending to maintain the shoe in parallelism with said rail but permitting departure from said parallelism to compensate, in the simultaneous engagement fo the shoe with two car wheels, for wheels of different widths, means individual to each shoe for restraining it from movement longitudinally of the track while permitting differential movement between its two ends in a lateral direction toward and from the adjacent rail, said means consisting of elements on the shoe and rail, respectively, one comprising a lug and the other having a notch that receives said lug, and means for moving the shoes in a direction away from the rails in opposition to said resilient means toward or to ineffective position.

PERCIVAL A. FANNER.